US006633958B1

(12) United States Patent
Passint et al.

(10) Patent No.: US 6,633,958 B1
(45) Date of Patent: *Oct. 14, 2003

(54) MULTIPROCESSOR COMPUTER SYSTEM AND METHOD FOR MAINTAINING CACHE COHERENCE UTILIZING A MULTI-DIMENSIONAL CACHE COHERENCE DIRECTORY STRUCTURE

(75) Inventors: Randal S. Passint, Chippewa Falls, WI (US); Steven L. Scott, Eau Claire, WI (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 272 days.

(21) Appl. No.: 08/971,184

(22) Filed: Nov. 17, 1997

(51) Int. Cl.⁷ .............................................. G06F 13/00
(52) U.S. Cl. ...................... 711/141; 711/119; 711/144; 711/145
(58) Field of Search .................... 711/119, 121, 711/141, 144, 145, 147

(56) References Cited

U.S. PATENT DOCUMENTS

| 5,265,232 A | * | 11/1993 | Gannon et al. ............ 711/124 |
| 5,634,110 A | | 5/1997 | Laudon et al. ............ 711/145 |
| 5,680,576 A | | 10/1997 | Laudon ..................... 711/145 |
| 5,752,258 A | * | 5/1998 | Guzovskiy et al. ......... 711/120 |
| 5,778,437 A | * | 7/1998 | Baylor et al. ............. 711/145 |
| 5,787,477 A | * | 7/1998 | Rechtschaffen et al. .... 711/119 |
| 5,900,015 A | * | 5/1999 | Herger et al. ............. 711/145 |

OTHER PUBLICATIONS

Chaiken, D., et al., "LimitLESS Directories: A Scalable Cache Coherence Scheme", *Proceedings: Fourth International Conference on Architectural Support for Programming Languages and Operating Systems*, Santa Clara, CA, (Apr. 8–11, 1991), pp. 224–234.

Lenoski, D., et al., "The Directory–Based Cache Coherence Protocol for the DASH Multiprocessor", *Proceedings: The 17th Annual International Symposium on Computer Architecture*, Seattle, Washington (May 28–31, 1990), pp. 148–159.

(List continued on next page.)

*Primary Examiner*—Glenn Gossage
(74) *Attorney, Agent, or Firm*—Schwegman, Lundberg, Woessner & Kluth, P.A.

(57) ABSTRACT

A cache coherence system and method for use in a multiprocessor computer system having a plurality of processor nodes, a memory and an interconnect network connecting the plurality of processor nodes to the memory. Each processor node includes one or more processors. The memory includes a plurality of lines and a cache coherence directory structure having a plurality of directory structure entries. Each of the directory structure entries is associated with one of the plurality of lines and each directory structure entry includes processor pointer information, expressed as a set of bit vectors, indicating the processors that have cached copies of lines in memory. Processor pointer information may be a function of a processor number assigned to each processor; the processor number may be expressed as a function of a first set of bits and a second set of bits which are respectively mapped into first and second bit vectors of the n bit vectors.

15 Claims, 10 Drawing Sheets

OTHER PUBLICATIONS

Lenoski, D., et al., "The Stanford Dash Multiprocessor", *Computer, 25*, (Mar. 1992), pp. 63–79.

Papamarcos, M.S., et al., "A Low–Overhead Coherence Solution for Multiprocessors with Private Cache Memories", *Proceedings: The 11th Annual International Symposium on Computer Architecture*, Ann Arbor Michigan (Jun. 5–7, 1984), pp. 348–354.

Laudon, J., et al., "The SGI Origin: A ccNUMA Highly Scalable Server" Proceedings of $24^{th}$ Intl. Symp. on Comp. Arch. (ISCA), 1997, pp. 241–251.

Scott, S.L., et al., "Performance of Pruning–Cache Directories for Large–Scale Multiprocessors", *IEEE Transactions on Parallel and DIstributed Systems*, vol. 4, No. 5, pp. 520–534, May 1993.

* cited by examiner

| NUMBER OF ACTUAL SHARERS | BEST CASE (4096) | RANDOM SHARING IN PARTITION OF SIZE: | | | | WORST CASE (4096) |
|---|---|---|---|---|---|---|
| | | 32 | 128 | 512 | 4096 | |
| 1 | 1 | 1 | 1 | 1 | 1 | 1 |
| 2 | 2 | 2 | 3.5 | 3.8 | 7.2 | 8 |
| 3 | 3 | 3 | 6.8 | 8.2 | 21.7 | 27 |
| 4 | 4 | 4 | 10.6 | 14.0 | 46.2 | 64 |
| 6 | 6 | 6 | 18.7 | 28.7 | 126.4 | 216 |
| 8 | 8 | 8 | 26.7 | 46.8 | 245.4 | 512 |
| 12 | 12 | 12 | 41.0 | 88.9 | 560.9 | 1152 |
| 16 | 16 | 16 | 53.1 | 134.0 | 930.4 | 2048 |
| 24 | 24 | 24 | 72.7 | 220.8 | 1656.8 | 3072 |
| 32 | 32 | 32 | 88.0 | 293.5 | 2254.8 | 4096 |
| 64 | 64 | – | 120.4 | 448.3 | 3506.8 | 4096 |
| 128 | 128 | – | 128.0 | 507.3 | 4028.6 | 4096 |
| 256 | 256 | – | – | 512.0 | 4095.0 | 4096 |
| 512 | 512 | – | – | 512.0 | 4096.0 | 4096 |
| 4096 | 4096 | – | – | | 4096.0 | 4096 |

FIG. 7

MULTIPROCESSOR COMPUTER SYSTEM AND METHOD FOR MAINTAINING CACHE COHERENCE UTILIZING A MULTI-DIMENSIONAL CACHE COHERENCE DIRECTORY STRUCTURE

BACKGROUND OF THE INVENTION

1. Field of the Invention

The present invention relates to memory access control in multiprocessors, and more particularly to a directory structure for maintaining cache coherency.

2. Background Information

In a shared-memory multiprocessor system with per-processor caches, it is desirable for hardware to keep the caches coherent. This means that when one or more processors have a copy of a block or line of memory and one of the processors performs a write to that line, the cached copies must either be updated or invalidated.

There are two basic mechanisms for doing this. One is to have all processors "snoop" on all write operations in the system and invalidate or update their own copies when appropriate. This is called "snoopy" coherence or "snooping caches", and is generally done in shared-bus multiprocessors.

The other alternative is to use directories that are associated with main memory. In large systems, memory, and thus the directories, may be physically distributed among the machine. The directory associated with a region of memory keeps track of which processors, if any, have copies of memory lines in that region. When a write occurs to a line, the directory is consulted, and updates or invalidates are sent to any processors that have a copy of the line. In this way, processors are relieved from having to snoop on all memory write traffic.

The basic problem with directories is that the required storage does not scale well. The canonical directory structure associates a directory entry with every line of main memory. Each directory entry consists of some state, along with a bit vector (one bit per processor in the system) indicating which processor(s) currently have a copy of the line. As the number of processors is increased, the number of lines for which directory information is needed grows linearly. In addition, the size of the directory entries also grows linearly. The net result is that the total amount of storage needed for the directories grows as the square of the number of processors, becoming prohibitively expensive for large systems.

There are a number of ways to reduce directory overhead. One way is to reduce the number of directory entries by noting that, since caches are much smaller than main memory, most memory lines will not be cached by any processor at any given time. Thus, the size of the directories are reduced, and the directory is managed as a cache. Any line for which a directory entry cannot be found is assumed to be in the uncached state.

Another way to reduce directory overhead is to limit the size of the directory entries such that an entry cannot represent any arbitrary set of processors in the system. The system is then either prohibited from allowing non-representable sets of processors to cache a line concurrently (by, say, invalidating the copies of certain processors when other processors obtain a copy of the line), or, more preferably, when a non-representable set of sharing processors occurs, the directory entry is set to represent some superset of the sharing processors. Then when the line is written, an invalidation or update message is sent to the superset of processors caching the line.

(The two approaches are orthogonal. That is, use of both approaches in tandem should result in a greater reduction in directory overhead than can be achieved with either one by itself.)

A mechanism for limiting the size of the directory entries is discussed next. In the following discussion, we will for convenience assume an invalidate-based coherence protocol, although the approach is equally applicable to an update-based protocol. A goal of a directory structure for a large multiprocessor system is to use a modest number of bits in a directory entry, yet minimize the number of "spurious" invalidation messages that must be sent when a line is written. That is, keep the superset as close to the size of the actual set of sharers as possible.

At one end of the spectrum is a full broadcast mechanism. In this scheme, as soon as a line becomes cached by any processor (or perhaps only when it is cached by more than one processor), the state of the corresponding directory indicate is set to indicate that a broadcast is necessary. When the line is written, invalidations are sent to all processors in the system. This mechanism minimizes the number of bits needed in the directory entry, but maximizes spurious invalidations. The performance of this scheme is very poor for large systems.

At the other end of the spectrum is the full bit-vector mechanism described above, in which a directory entry includes a bit for each processor in the system. This maximizes directory storage overhead, but eliminates spurious invalidations. The storage overhead for this scheme is unacceptable for large systems.

A reasonable middle ground is a "coarse-vector" directory structure like the one used in the Origin "™" 2000 manufactured by Silicon Graphics Inc (SGI) of Mountain View, Calif. The directory structure in the Origin "™" 2000 includes a bit vector of size v in the directory entries (where v=32). Each bit represents one or more processor nodes in the system; for systems with thirty-two or fewer nodes, this size bit vector acts like a full bit vector. For larger numbers of nodes, however, the vector can become "coarse". When the set of processor nodes sharing a line is contained within an aligned block of consecutive processor nodes, then the bit vector can still be used as a full bit vector, with another small field in the directory entry specifying the block of processor nodes the vector represents. Processor nodes will typically contain one or more processors; in the Origin "™" 2000, each processor node includes two processors.

When the set of processor nodes expands beyond an aligned block of v processor nodes, however, the meaning of the bits in the vector is changed (this is recorded in the state information in the entry). For N-processor-node systems, each bit in the vector now represents N/v processor nodes. For example, in a 512-processor node system with a 32-bit vector, each bit in the vector represents sixteen processor nodes. For every processor node caching the line, the bit representing the set of processor nodes containing that processor node would be set. When the line is written, for each bit that is set in the coarse vector, invalidation messages are sent to the corresponding set of N/v processor nodes. In most cases, this will cause invalidations to be sent to some processor nodes that do not have a copy of the line (spurious invalidates). However, the number of spurious invalidates will generally be much fewer than would be sent with the full broadcast mechanism.

Such an approach is effective in reducing the size of each directory entry. Such an approach does, however, continue to scale linearly as the number of processors in the system increase. What is needed is a better way of compacting directory entries.

SUMMARY OF THE INVENTION

The present invention is a cache coherence system and method for use in a multiprocessor computer system having a plurality of processor nodes, a memory and an interconnect network connecting the plurality of processor nodes to the memory. Each processor node includes one or more processors. The memory includes a plurality of lines and a cache coherence directory structure having a plurality of directory structure entries. Each of the directory structure entries is associated with one of the plurality of lines and each directory structure entry includes processor pointer information, expressed as a set of bit vectors, indicating the processor nodes that have cached copies of lines in memory.

According to another aspect of the present invention, a method is described for maintaining cache coherency across a computer system having a plurality of processor nodes, including a first and a second processor node, wherein each of the plurality of processor nodes includes a cache and at least one processor. The method comprises the steps of assigning a processor number to each of the plurality of processor nodes, defining a plurality of bit vectors, wherein each processor node is represented by a bit in each of the plurality of bit vectors, determining a first location in memory, reading a line from the first location into the cache of said first processor node, wherein the step of reading includes the step of setting a bit in each of the plurality of bit vectors as a function of the processor number assigned to the first processor node, reading a line from the first location into the cache of the second processor node, wherein the step of reading includes the step of setting a bit in each of the plurality of bit vectors as a function of the processor number assigned to the second processor node, and writing to the first location. The step of writing includes the steps of a) determining, as a function of bits set in the bit vectors, processor nodes holding a copy of the line; and b) sending a message to the processor nodes determined in step a) indicating that the line read from the first location is no longer valid. In one embodiment the step of sending a message to the processor nodes includes the step of updating the line.

According to yet another aspect of the present invention, a computer readable medium is described having program code for maintaining cache coherency across a computer system having a plurality of processor nodes, including a first and a second processor node, wherein each of the plurality of processor nodes has an assigned processor number and wherein each of the plurality of processor nodes includes a cache and at least one processor. The program code comprises program code for defining a plurality of bit vectors, wherein each processor node is represented by a bit in each of the plurality of bit vectors, program code for determining a first location in memory, program code for reading a line from the first location into the cache of the said first processor node, wherein the program code for reading includes program code for setting a bit in each of the plurality of bit vectors as a function of the processor number assigned to the first processor node, program code for reading a line from the first location into the cache of the second processor node, wherein the program code for reading includes program code for setting a bit in each of the plurality of bit vectors as a function of the processor number assigned to the second processor node and program code for writing to the first location. The program code for writing includes program code for determining, as a function of bits set in the bit vectors, processor nodes holding a copy of the line and program code for sending a message indicating that the line read from the first location is no longer valid. In one embodiment the program code for sending a message to the processor nodes includes program code for updating the line.

BRIEF DESCRIPTION OF THE DRAWINGS

In the drawings, where like numerals refer to like components throughout the several views.

FIGS. 3a and 3b illustrate distributions of processors across bit vectors in approximate and coarse mode embodiments, respectively;

FIG. 7 is a table illustrating the number of directory pointer invalidations sent as a function of the number of processors which could be sharing the cache line;

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
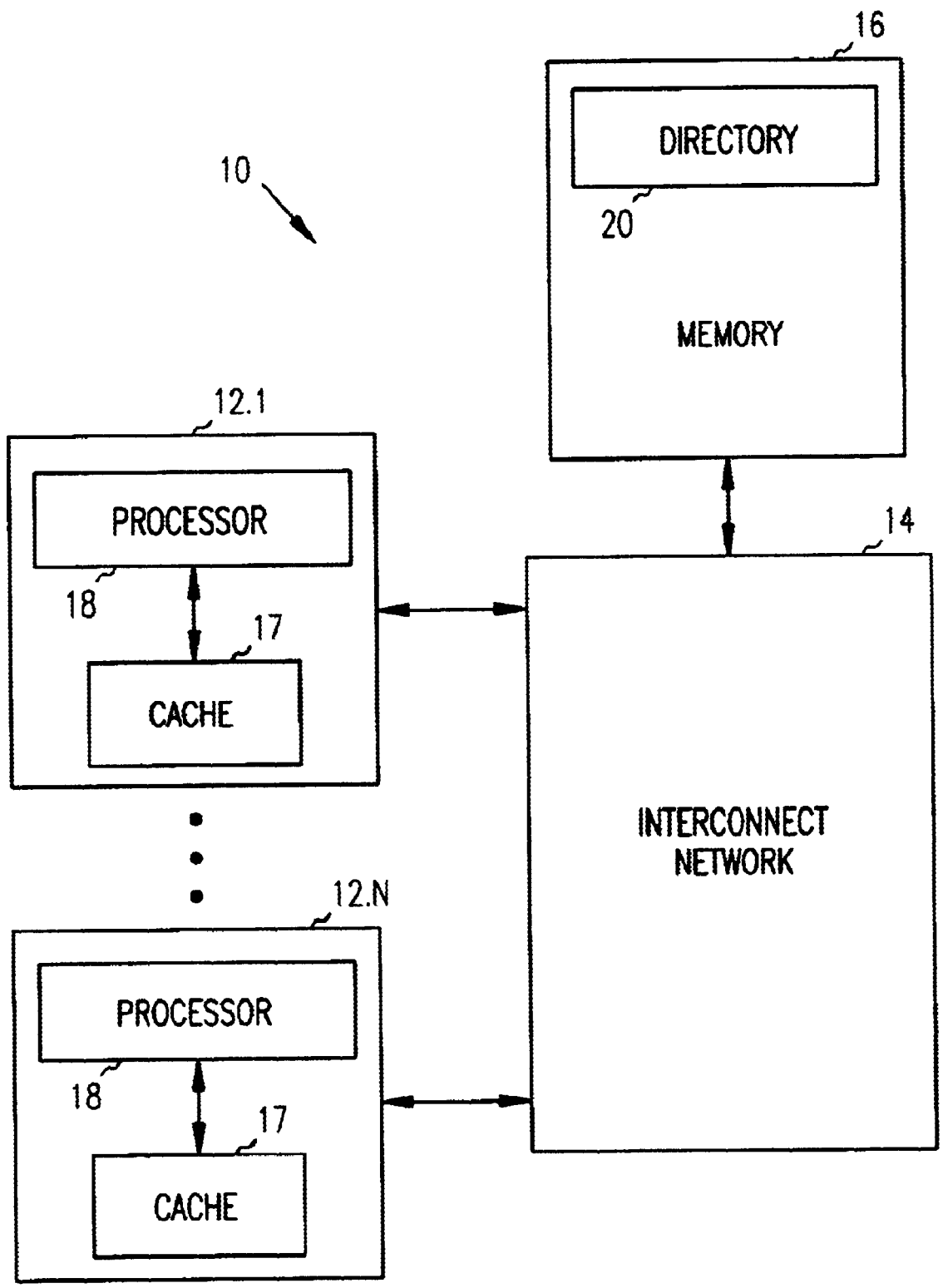
FIG. 1 shows a multiprocessor system having a multi-dimensional cache coherence directory structure.

A multiprocessor system 10 is shown in FIG. 1. In FIG. 1, a plurality of processor nodes 12.1 through 12.N are connected to a memory 16 by an interconnect network 14. Each processor node 12 includes a cache 17 and at least one processor 18. Network 14 can be implemented as any version of interconnect network, from a bus to a hypercube or mesh architecture. Memory 16 may be distributed or centralized memory. In one distributed memory embodiment, memory 16 is implemented as sections of local memory placed in close proximity to each of processor nodes 12.1 through 12.N. In another distributed memory embodiment, memory 16 is distributed as sections of memory which are physically separate from processor nodes 12.1 through 12.N.

A directory structure 20 resident in memory 16 is used to monitor cache coherence. In one such embodiment, directory structure 20 is maintained in nonvolatile memory 19 within memory 16.

In contrast to the sin e bit vector approach discussed above, in a multi-dimensional approach, directory structure 20 uses two or more bit vectors to track each processor node 12. That is, each processor node is represented by a bit in each of the two or more bit vectors. In the following description, a two-dimensional directory structure 20 will be discussed first. The description will then be extended to directory structures having three or more dimensions. For simplicity, each description will be made in terms of a system in which processor numbers are assigned to each processor. It should be obvious that such a system can also be extended to cover systems in which processor numbers are assigned to processor nodes and each node has two or more processors.

Figure 9:
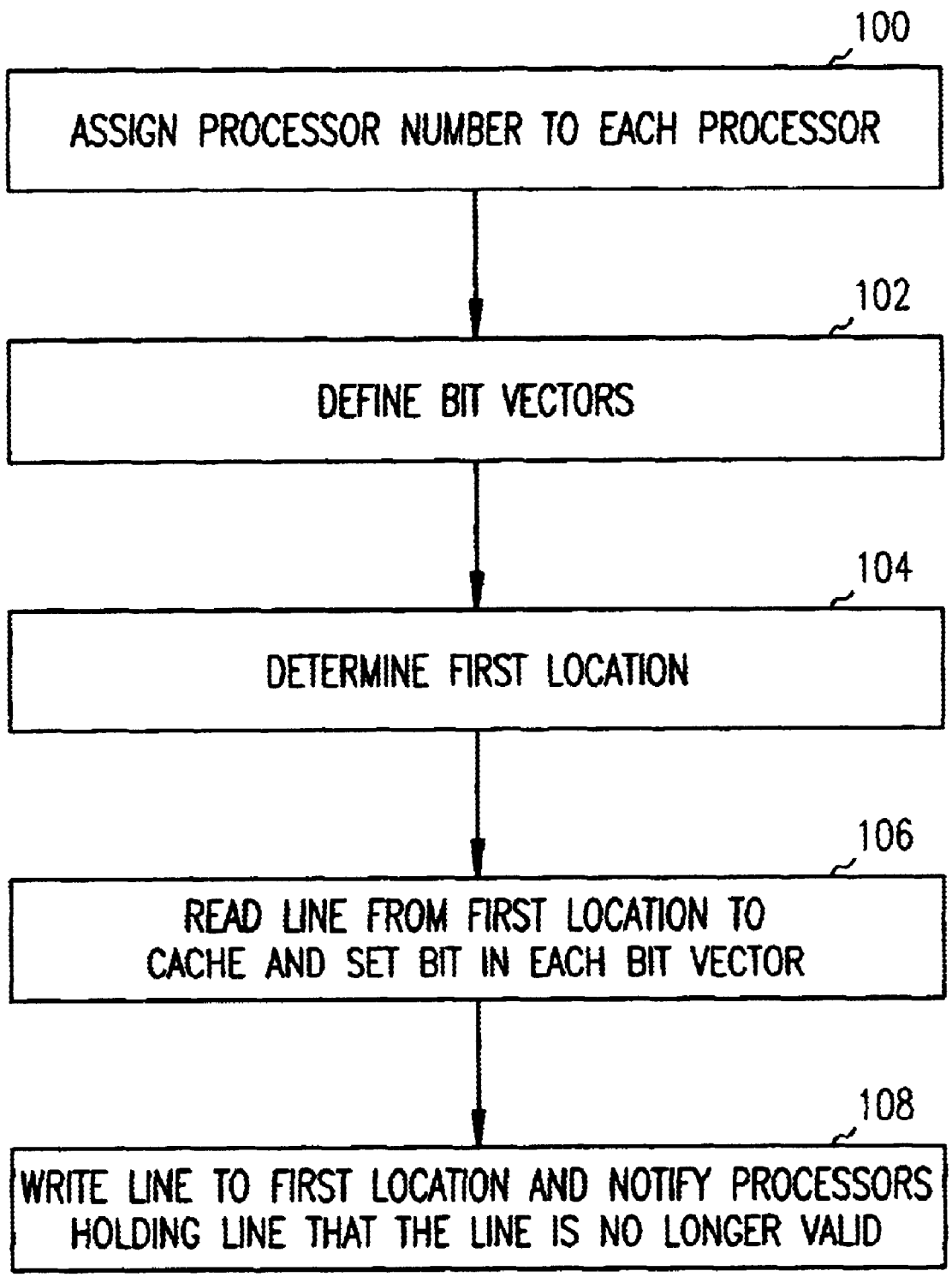
FIG. 9 is a flow chart illustrating a method of maintaining cache coherency across a computer system having a plurality of processors or processor nodes.

A method of maintaining cache coherency across a computer system having a plurality of processors or processor nodes is shown generally in FIG. 9. Each processor node is assigned a processor number. In FIG. 9, two or more bit vectors are defined at 100, wherein each processor node is represented by a bit in each of the plurality of bit vectors. At 102, a check is made to see if a line should be read from memory. If not, control stays at 102. If, however, the check determines that a line should be read from memory, control moves to 104 and a line is read from the first location in memory. Control then moves to 106, where a bit is set in each of the bit vectors as a function of the processor number of the processor node which read the line from the first location in memory. Control then moves to 108, where a check is made to see if the line should be written to the first location in memory. If not, control moves to 102.

If, however, the check determines that the line should be written to the first location in memory, control moves to 110 and a check is made to determine the processor nodes holding a copy of the line to be written. Control then moves to 112, where a message is sent indicating that the line is no longer valid.

The method shown in FIG. 9 could be implemented in a computer using program code or some other form of computer instructions for each of steps 100 through 112. The computer instructions could be stored on volatile or nonvolatile memory and transported as such.

A method of maintaining cache coherency across a computer system having a plurality of processors or processor nodes is shown generally in FIG. 9. Each processor or processor node is assigned a processor number at 100. At 102, two or more bit vectors are defined, wherein each processor or processor node is represented by a bit in each of the plurality of bit vectors. At 104, a first location in memory is determined. At 106, a line is read from the first location in memory and a bit is set in each of the bit vectors as a function of the processor number of the processor node which read the line from the first location in memory. At 108, a line is written to the first location in memory. Processor nodes holding a copy of the line are determined as a function of bits set in the bit vectors and a message is sent to the processors determined to hold a copy of the line.

The method shown in FIG. 9 could be implemented in a computer using program code or some other form of computer instructions for each of steps 100 through 108.

Figure 2A:
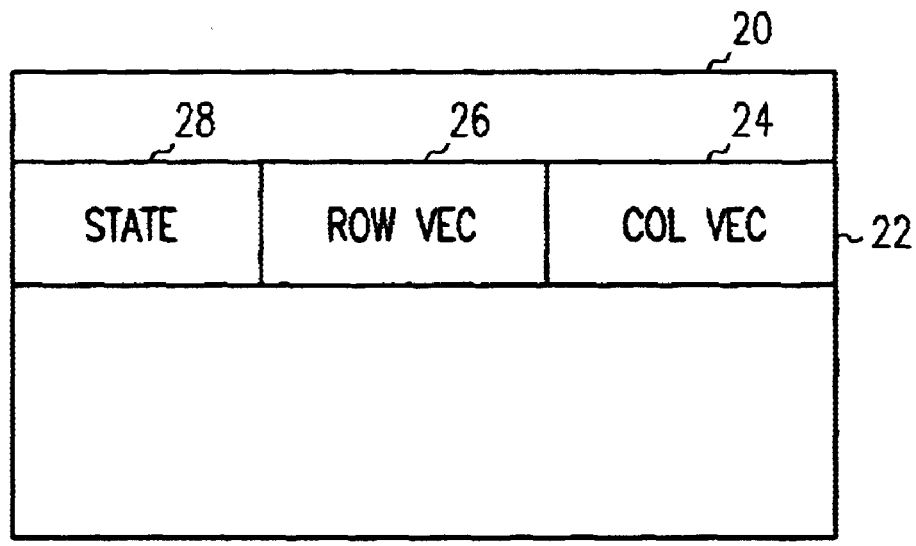
FIGS. 2a and 2b illustrate two embodiments of two-dimensional directory structures which can be used according to the present invention.

One embodiment of a two-dimensional cache coherence directory structure is shown in FIG. 2a. In FIG. 2a, directory structure 20 includes two or more entries 22. Each entry 22 includes a column vector 24 and a row vector 26. Column vector 24 is a c-bit vector (where c is an integer greater than one). Row vector 26 is an r-bit vector (where r is an integer greater than one). In one such embodiment, each entry 22 includes a state indicator 28 which specifies whether the line is cached by a single processor or multiple processors, and how the rest of the directory entry should be interpreted (i.e., the mode of directory entry 22).

Figure 2B:
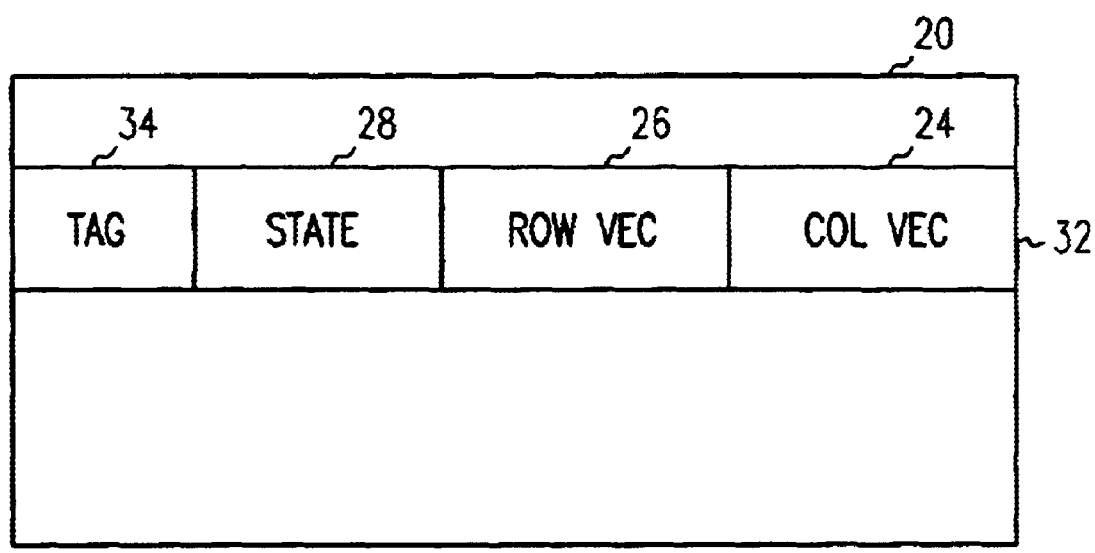

Another embodiment of a two-dimensional cache coherence directory structure is shown in FIG. 2b. In FIG. 2b, directory structure 20 includes a set of entries 32. Each entry 32 includes a tag 34, a state indicator 28, a column vector 24 and a row vector 26. Once again, column vector 24 is a c-bit vector (where c is an integer greater than one). Row vector 26 is an r-bit vector (where r is an integer greater than one). In the embodiment shown in FIG. 3b, each entry 22 includes a state indicator 28 which specifies whether the line is cached by a single processor or multiple processors, and how the rest of the directory entry should be interpreted (i.e., the mode of directory entry 22). In addition, in cases where the directory is managed as a cache, a tag field 34 is used to specify the line to which the directory entry refers. (Note: In directories 20 which provide a directory entry for every line of memory, there is no need for a tag field 34; this information is implied by the position of entry 22 within directory structure 20.)

In one embodiment, state indicator 28 has three modes: exact, approximate and coarse. In exact mode, one or more processors have a copy of the line, but they fall within an aligned block of r processors. In one such embodiment, the column vector specifies the block number (necessary only if the system size, N, is greater than r), and the row vector has one bit set to represent each processor in the sharing set. The special case where one processor has exclusive access to the line is a subset of this state, and may use a different encoding (such as simply storing the processor number).

In approximate mode, multiple processors have a copy of the line that do not fall within an aligned block of r processors, but N<=r*c. In this case, each bit in the column vector represents an aligned block of r processors, and each bit in the row vector represents a "slice" of processors with matching bits in the lower log2(r) bits of their processor numbers.

Finally, in coarse mode multiple processors have a copy of the line that do not fall within an aligned block of r processors, and N>r*c. In this case, each bit of the row vector represents a slice of processors, just as in the approx mode. Each bit in the column vector, however, represents N/(r*c) blocks of r processors.

In exact mode, the directory entry keeps track of the exact sharing set for its line. When the line is written, only those processors who have cached the line are sent invalidations.

Figures 3A, 3B:
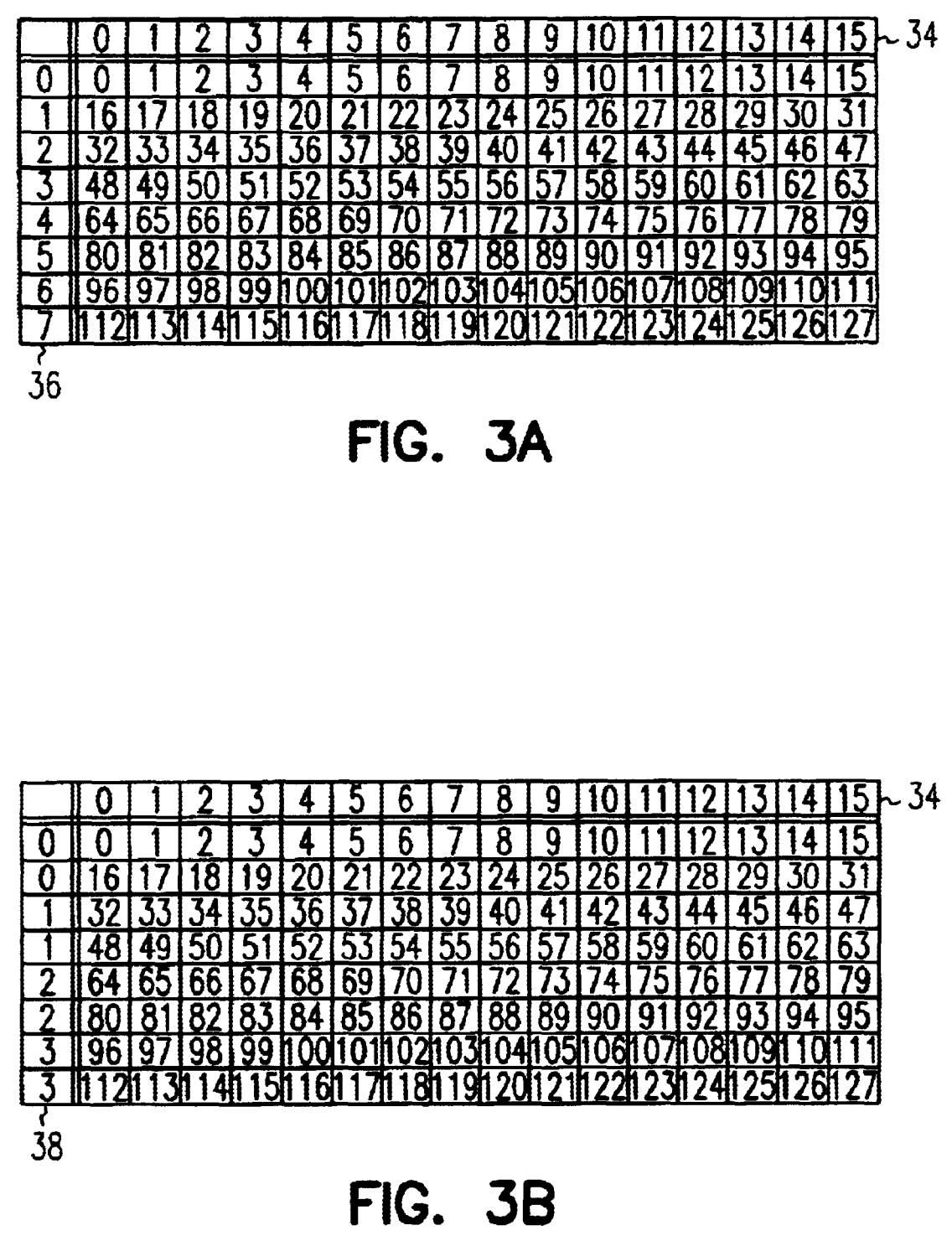

The approximate mode can be illustrated with the diagram in FIG. 3a, which represents a 128-processor system using directory entries with a 16-bit row vector 34 and an 8-bit column vector 36. In the approximate mode, each time a new processor caches a copy of a line, the bit corresponding to that processor in the row vector and the bit corresponding to that processor in the column vector are set. For example, if processors 18 and 90 have a copy of a line, then bits 2 and 10 will be set in the row vector, and bits 1 and 5 will be set in the column vector. When the line is subsequently written, four invalidation messages will be sent by the directory, corresponding to all processors whose row and column vector bits are set (processors 18, 26, 82 and 90). In this case, two spurious invalidations are sent (processors 26 and 82).

Note that if all processors sharing the line were in the same row (say, processors 17, 18 and 23), then only a single column vector bit would be set, and the exact mode could be used. If all processors sharing the line were in the same column (say processors 17, 33 and 49), then the directory entry would exactly represent the sharing set, even though this could not be represented in exact mode. In general, if the processors sharing a line tend to be clustered in one part of the machine (say, in the range 0–47 in the above example), then the fact that bits 7:3 are not set the in the column vector will prevent spurious invalidations from being sent to the remainder of the machine.

The coarse mode can be illustrated by the diagram in FIG. 3b, in which a 128-processor machine uses directory entries with a 16-bit row vector 34 and a 4-bit column vector 38. Here each bit in the column vector represents two 16-processor rows. This mode is required when the number of processors in the system exceeds r*c.

Let us assume again that processors 18 and 90 have cached a given line. In the directory entry for this line, the row vector will have bits 2 and 10 set. The column vector will have bits 0 and 2 set. Now if the line is written to, invalidations will be sent to all processors whose corresponding bits are set in the row and column vectors (processors 2, 18, 10, 26, 66, 82, 74 and 90). Since the column vector has a coarseness of 2, twice as many invalidations are sent as in the approximate case, so there are 6 spurious invalidations.

The above approach can be advantageous. The measure of goodness or effectiveness for a directory entry structure for a scalable multiprocessor is that it uses amount of storage, and yet covers large machines without causing large numbers of spurious invalidations. That is, the set of processors denoted by a directory entry should in practice be as small a superset of the actual sharing processors as possible. As discussed above, a full bit vector is perfect (no spurious invalidations), but requires a prohibitively large directory entry for large systems. A full broadcast scheme requires very little storage, but results in a very large number of spurious invalidations. In contrast, the embodiments described above use a fixed, modest amount of storage per directory entry, yet provide very good coverage in most cases.

The two-dimensional directory entry structure is a significant improvement over the one-dimensional coarse vector scheme. Consider, for example, a 512-processor machine, with a two-dimensional directory entry structure with r=32 and c=16, or a one-dimensional "coarse vector" directory entry with a 32-bit vector and a 4-bit cluster number. The 2D structure requires twelve additional bits per entry but can reduce the number of spurious invalidations substantially as will be discussed below.

Both structures will provide perfect information for sharing sets contained within aligned blocks of 32 processors. When sharing is not contained to within such a block, however, the two-dimensional structure performs much better. It will result in at most four invalidations when two processors have cached a copy of a line. The 1D coarse vector will result in 2*(512/32)=32 invalidations. The key is that the zero bits in the column vector provide "fire walls" that prevent the propagation of invalidations to most of the machine.

In some situations it may be better to add even more dimensions to the directory structure. In one embodiment, directory structure 20 is an n-dimensional structure in which each entry includes a state indicator and n bit vectors V[0], V[1], ..., V[N−1] each a power of two in length (L0, L1, ..., Ln−1). One such embodiment is shown in FIG. 4.

Figure 4:
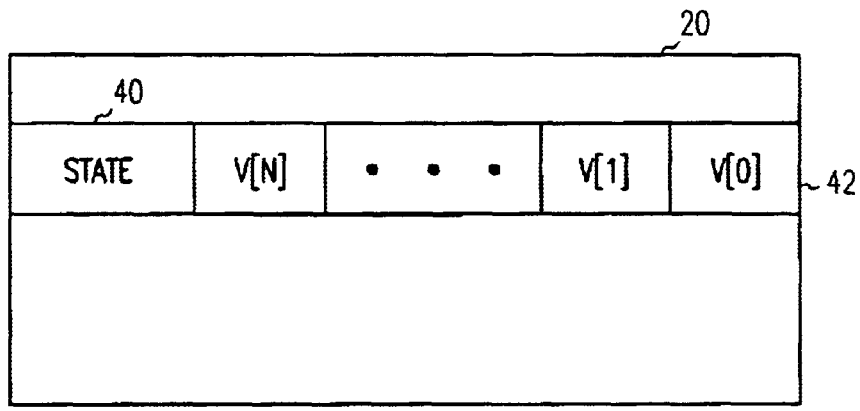
FIG. 4 illustrates an embodiment of an n-dimensional directory structure which can be used according to the present invention.

In the embodiment shown in FIG. 4, a given processor in the machine is represented by a bit in each one of the pointer vectors. In one embodiment, the bit set in V0 is determined by a decode of the low-order log(L0) bits of the processor number. The bit set in V1 is determined by the next log(L1) bits of the processor number, and so on.

Figure 5:
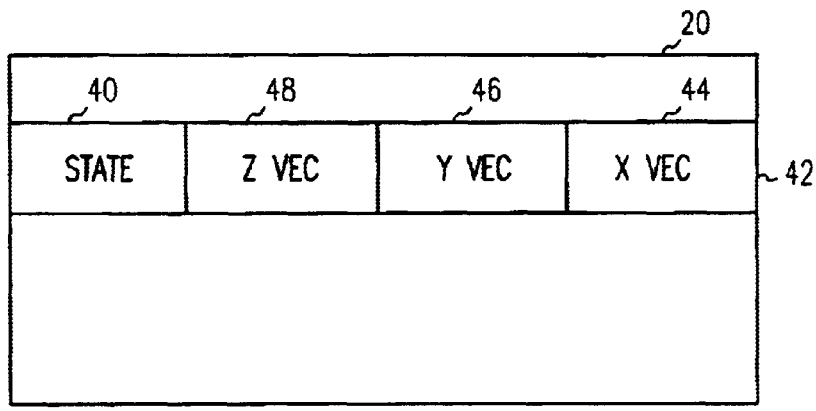
FIG. 5 illustrates an embodiment of a three-dimensional directory structure based on the embodiment shown in FIG. 4.
Figure 6:
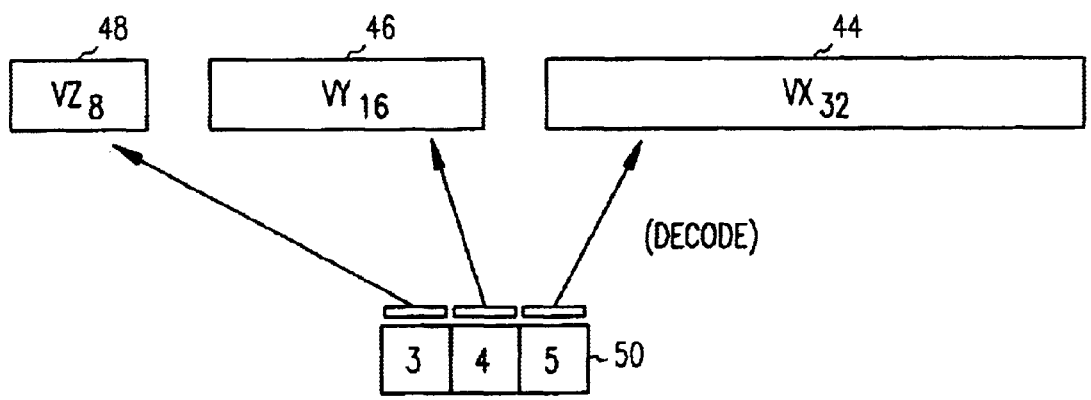
FIG. 6 illustrates one embodiment of a processor number mapping which could be used in the three-dimensional directory structure of FIG. 5.
Figure 8A:
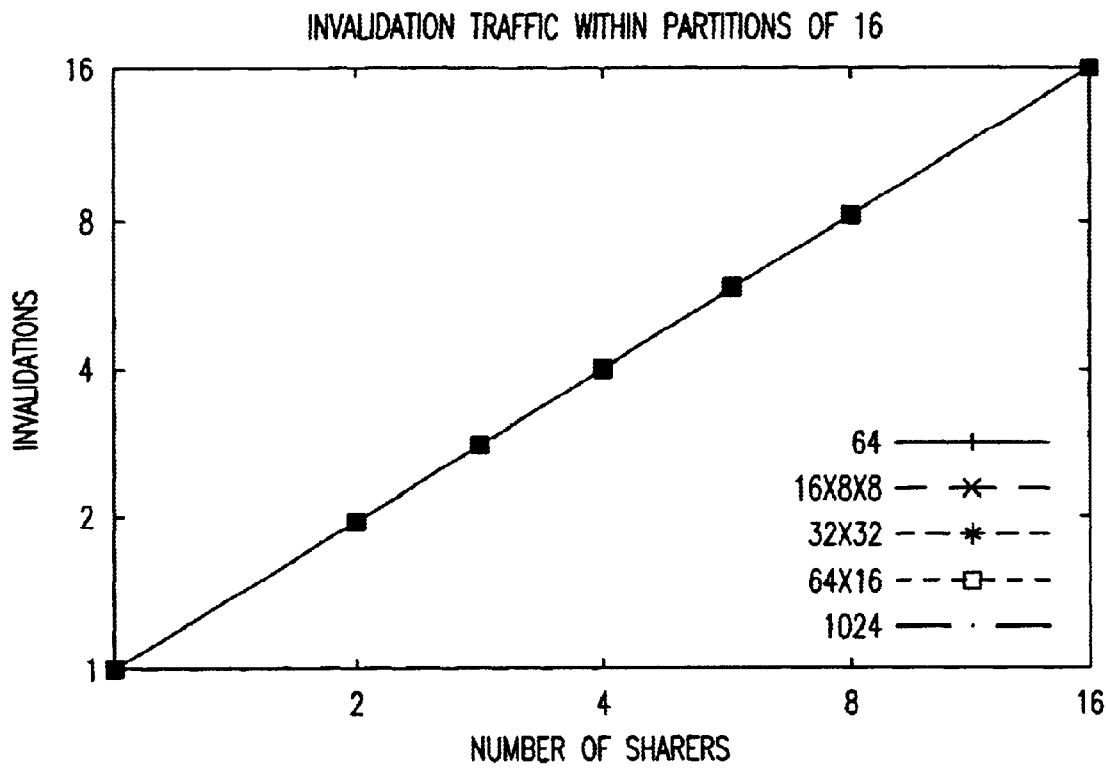
FIGS. 8a through 8g are graphs showing the performance of different directory structures as the number of processors in the system increase.
Figure 8B:
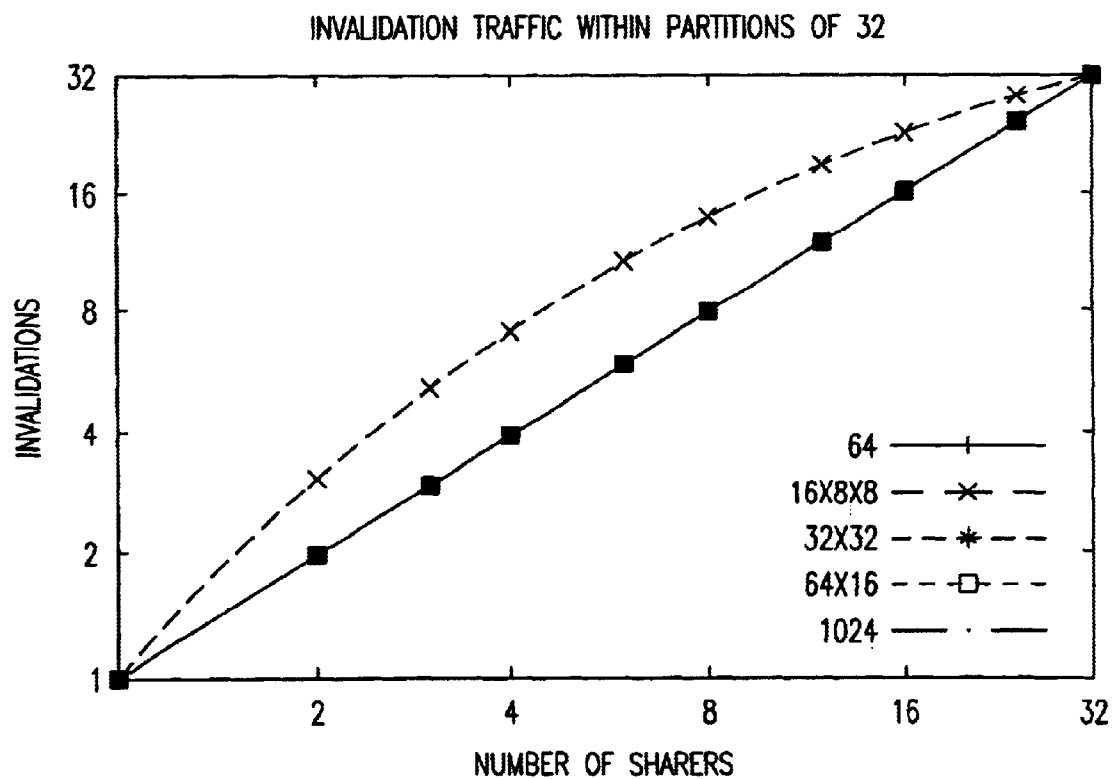
Figure 8C:
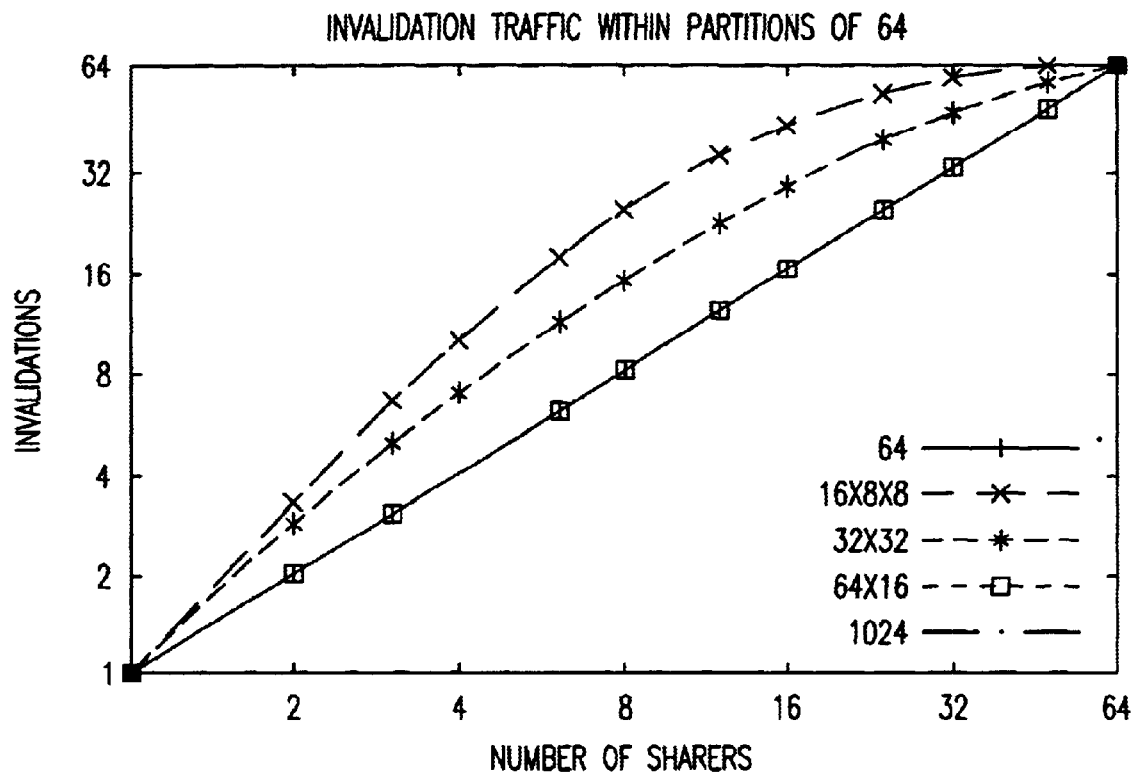
Figure 8D:
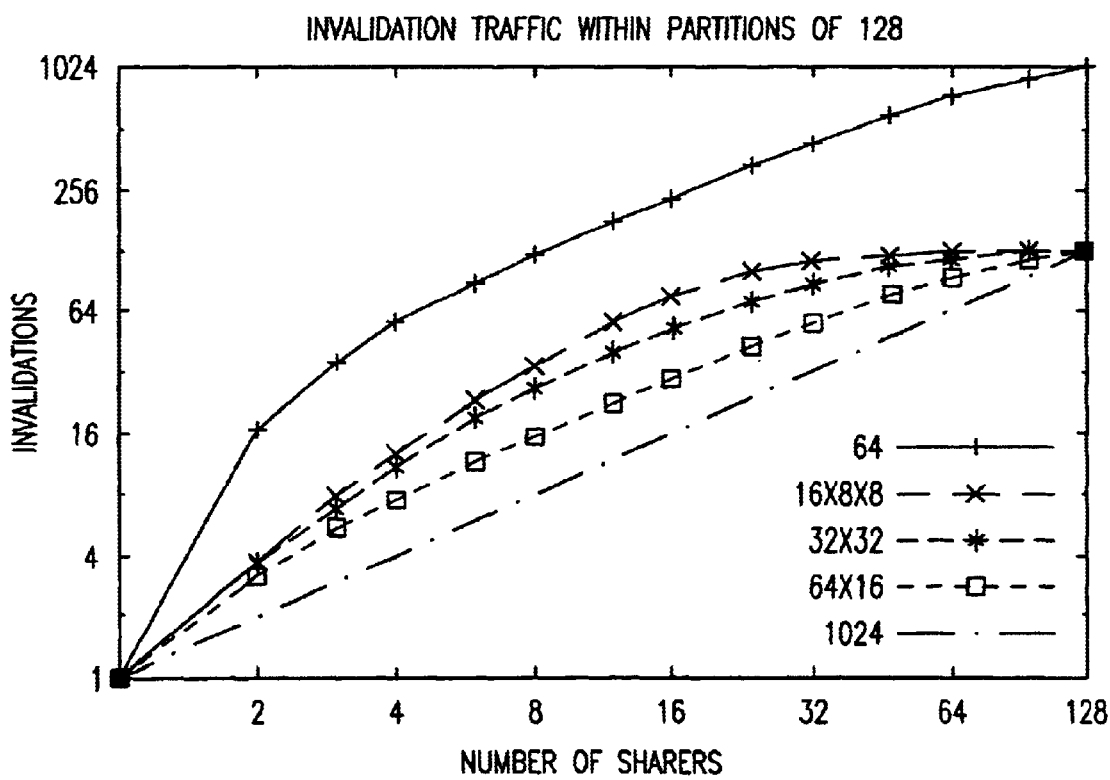
Figure 8E:
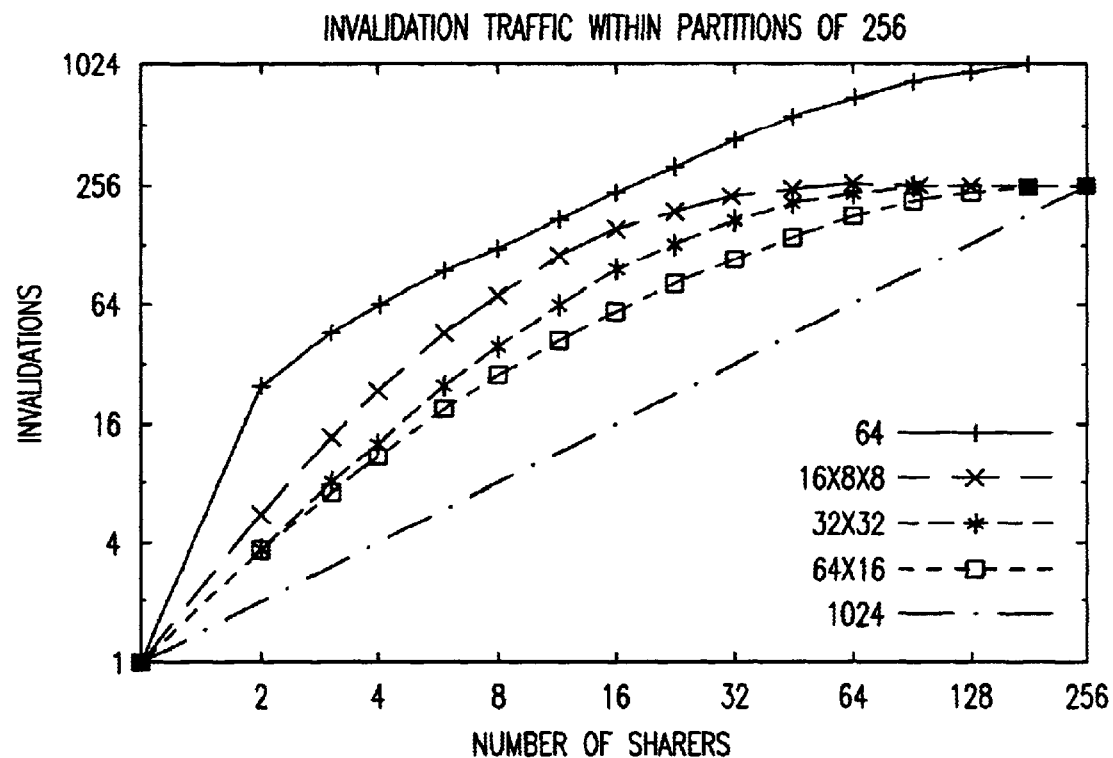
Figure 8F:
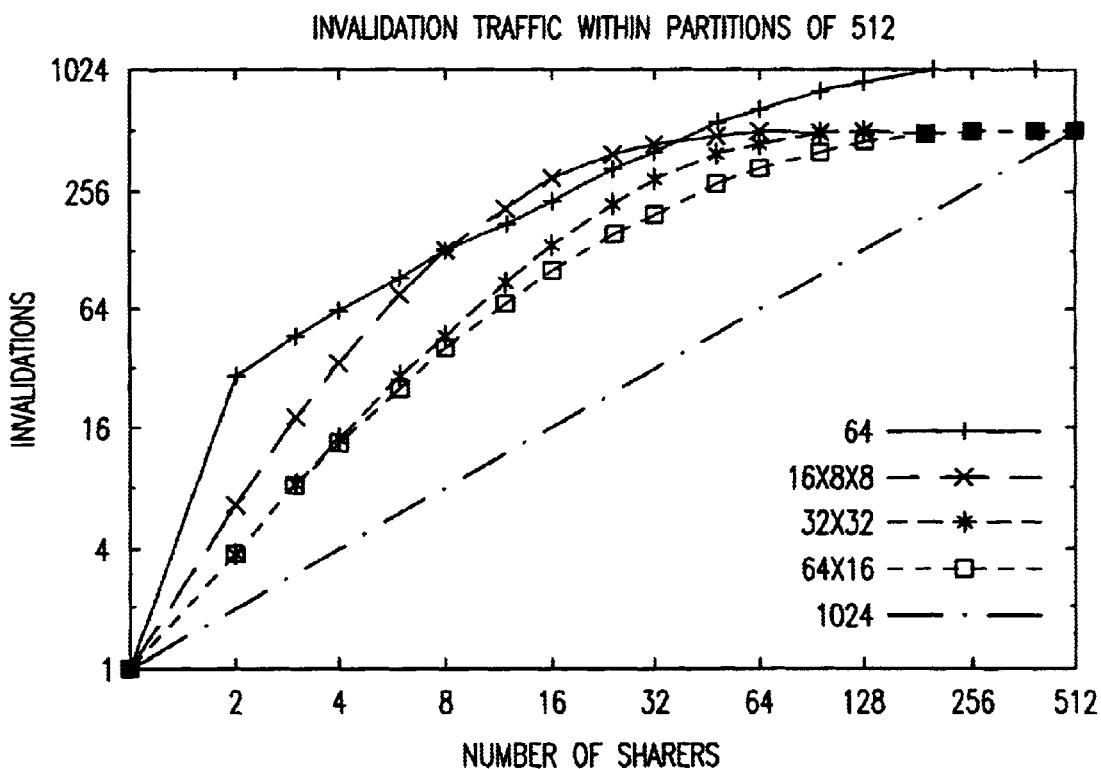
Figure 8G:
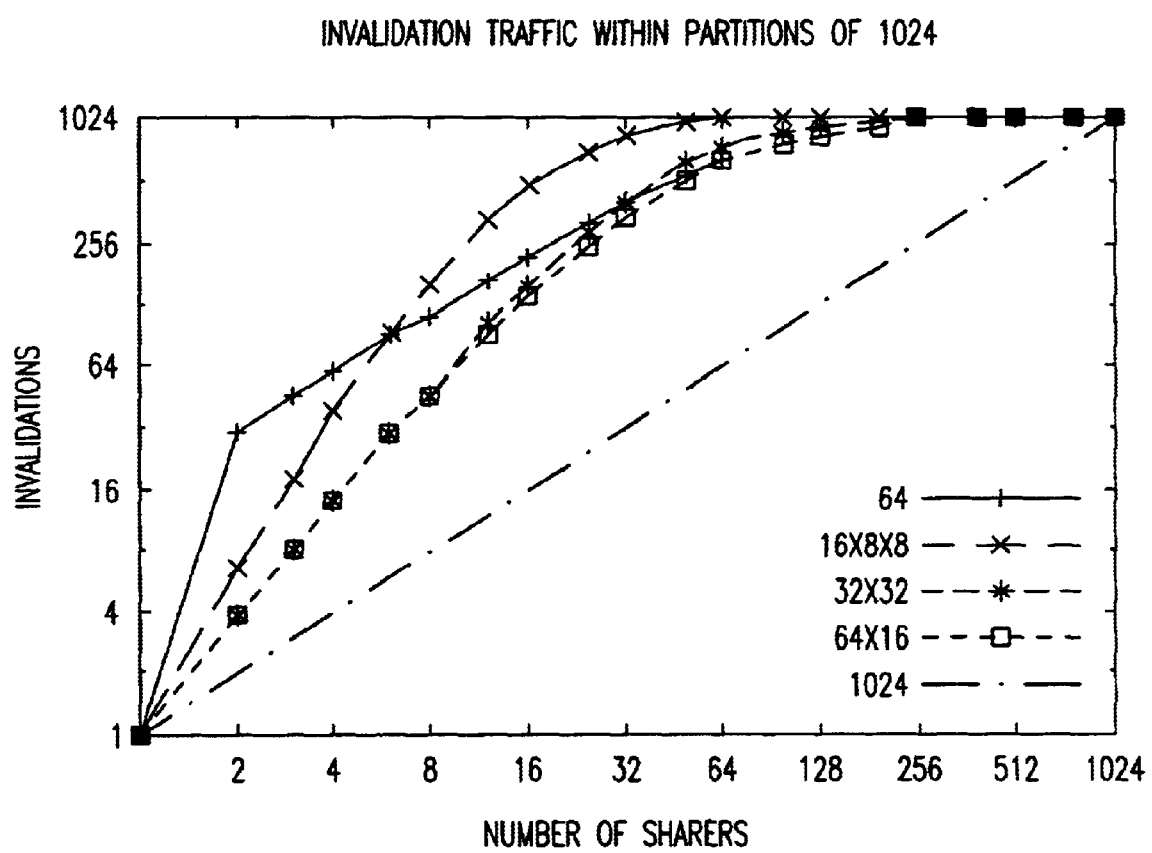

As an example, in one massively parallel processing embodiment, cache coherence directory structure 20 is a three-dimensional structure in which each entry 42 has a state indicator 40 and three bit vectors: a 32-bit X vector (VX) 44, a 16-bit Y vector (VY) 46 and an 8 bit Z vector (VZ) 48. Such an embodiment is shown in FIG. 5. In one such embodiment, as illustrated in more detail in FIG. 6, the bit set in VX is determined by a 5-to-32 decode of bits [4:0] of physical processor number 50. The bit set in VY is determined by a 4-to-16 decode of bits [8:5] of the physical processor number. The bit set in VZ is determined by a 3-to-8 decode of bits [11:9] of the physical processor number. In addition, in situations where directory structure 20 is managed as a cache, a tag field (not shown) is used to tie a line in memory 16 to a particular directory entry 42.

The set of processors pointed to by a given directory entry include all processors whose corresponding VX, VY and VZ bits are set. This is the set of processors that will receive invalidation messages when the line is written. In a system in which a function PopCount(Vi) is a count of the number of bits in bit vector Vi, the total number of processors pointed to by a directory entry=PopCount(VX) * PopCount(VY) * PopCount(VZ).

Coarse Pointers

If the product of the lengths of the n vectors (R, for reach) is less than the number of processors in the system (N), then the directory entry can become coarse. In this case, the granularity of the invalidations becomes G=N/R. Essentially, this means that log(G) bits of the processor number are not used to select a bit in any of the vectors. In one such embodiment, the bits that are ignored are the log(G) most significant bits of the processor number but other combinations of bits could be used depending on the application.

In one embodiment, a directory entry remains in a non-coarse mode as long as sharing of the associated line is kept within an aligned block of R processors. This is accomplished by log(G) extra bits that encode which block of R processors the bit vectors apply to.

Once sharing expands beyond this block, the directory entry becomes coarse. In a three-dimensional system, in coarse mode the total number of processors pointed to by a directory entry=G * [PopCount(VX) * PopCount(VY) * PopCount(VZ)]. When the line is invalidated, for each combination of bits in the n vectors, invalidations are sent to all G processors mapping to that combination (these processors are considered aliases).

Spurious Invalidations

When only one processor has a cached copy of a line, the directory entry for that line will have exactly one bit set in each pointer vector and the processor will be exactly represented. This is the exact mode discussed above. In approximate mode, however, multiple processors may cache a copy of a line, and the directory pointer information may become inexact, in which case it will point to a superset of the processors that actually cached the line.

As each processor obtains a copy of a shared line, the bits corresponding to that processor are set in each of the n vectors of the associated directory entry. If n-1 of the vectors have only a single bit set, then the pointer information remains exact. If more than one bit is set in at least two of the fields, however, then the pointer information can become inexact, or approximate.

For example, in the three-dimensional example above, if processors 1 and 35 cache a line, then bits 1 and 3 will be set in VX, and bits 0 and 1 will be set in VY. If this line is subsequently written, then invalidation messages will be sent to processors 1, 3, 33 and 35. The invalidations to processors 3 and 33 are called spurious, as they resulted from inexact directory information rather than actual sharing.

The table shown in FIG. 7 illustrates the effectiveness of the three-dimensional directory entry discussed above. The table shows the number of invalidations that will be sent in a maximum-sized machine (here, 4096 processors) when a line is invalidated versus the number of true sharers for the line. Six cases are considered: the best-case distribution of true sharers, the worst-case distribution of true sharers, and a uniformly random distribution of sharers within partitions of size 32, 128, 512 and 4096.

Evaluation of Processor Pointer Alternatives

In the following discussion, possible alternatives and the trade-offs between coarseness, aspect ratio and dimensionality are examined. Several formats for the processor pointer are considered and the effect of each format on the number of invalidations that result under various degrees of sharing is examined. A system size of 1024 processors is assumed.

The pointer formats evaluated are:
* 64 (coarse)
* 1024
* 32×32
* 64×16
* 16×8×8 and the hypotheses tested are:
1. Given the same reach, using fewer dimensions is better (e.g.: a full 1024 bit vector will outperform a 32×32 2D vector, which will outperform a 16×8×8 3D vector). This seems quite obvious.
2. Given an n-dimensional vector of a given reach, elongating the aspect ratio will improve performance (e.g.: 64×16×4 is better than 32×16×8, which is better than 16×16×16). This is somewhat less clear, but seems reasonable. The more elongated the aspect ratio, the more bits required in the directory entry, and the closer the format is to one of a lower dimensionality.
3. Given an approximately equal number of bits, it is better to go to higher dimensionality and fully cover the machine than to use a format that must go coarse in large machines. This is the least clear of our hypotheses.

The alternatives were evaluated using Monte Carlo simulation of sharing, while confining sharing to varying subsets of the machine. In applied mathematics, the name "Monte Carlo" is given to the method of solving problems by means of experiments with random numbers, but the term has come to mean any simulation problem that uses random numbers.) The results are shown in the graphs of FIGS. 8*a*–8*g*. Each graph assumes that sharing is confined to a certain subset (from 16 to 1024 processors) of the machine. The number of sharers is varied along the X axis, assuming a uniform random distribution within the partition, and the number of invalidations sent on a write is plotted on the Y axis.

The 1024-bit full vector always performs optimally, resulting in no spurious invalidations. When sharing is constrained to a 16-processor region, all the other pointer formats perform optimally too. As sharing expands to larger numbers of processors, the other formats all eventually lead to spurious invalidations (a great number in some cases).

Discussion of Results

The real areas of interest in the graphs of FIGS. 8*a*–8*g* are the left end (1–4 sharers, perhaps up to 8), and, to a lesser extent, the right side of the graph (representing the occasional invalidation of a widely-read variable). Sharing distributions tend to be bi-modal, with most lines being cached by one or a small number of processors, but some widely-read data.

The results validate the hypotheses stated above. The full 1024-bit vector always performs as well or better than the 32×32, which performs as well or better than the 16×8×8. This is not at all surprising. We can also see that elongating the 2D vector's aspect ratio improves performance. For both of these comparisons, the better-performing pointer formats also require more bits, which stands to reason.

Given a limited number of available bits, the next question is whether it is better to use a higher dimensional directory entry structure rather than using a lower dimensional directory entry structure that must become "coarse" for large system coverage.

From the graphs, it can be seen that the two-dimensional 32×32 format performs equal to the single dimensional 64-bit format within a 32-processor partition, somewhat worse than the 64-bit format within a 64-processor partition (in which the 64-bit vector provides perfect information), but substantially better than the 64-bit format for sharing in partitions of more than 64 processors. Overall, it is clearly a better solution.

It can also be seen that the three-dimensional 16×8×8 format performs significantly better than a coarse two-dimensional 16×16 format. Although the 16×16 format performed slightly better than the 16×8×8 within a partition of 256 processors (because the 16×16 covered the partition completely with a 2D vector while the 16×8×8 used three dimensions), it performed significantly worse at a partition size of 512 processors.

It also appears that "coarseness" complicates the design somewhat. With the full-coverage formats, there is only one mode, period, for any number of sharers in the machine. The hardware never has to switch from one directory format to another.

We have also explored a technique in which the directory bits are "repacked" when a directory entry switches to coarse mode. The repacking is done so that aliased groups of processors (those pointed to by selecting a particular bit in each vector) are contiguous rather than interleaved. In other words, once coarse, the log(G) bits not used to specify the bits in the vectors are the low order bits, rather then the high order bits that are ignored before the directory entry goes coarse.

This repacking is done in Origin "™" 2000 systems which are manufactured by Silicon Graphics, Inc. as discussed earlier when sharing exceeds a partition of 64 nodes. This is easy to do with a one-dimensional vector, but significantly more complicated with a two-dimensional vector.

Simulation results show that this repacking improves the performance of coarse formats considerably for large numbers of sharers; that is, the coarse entries do not cause a huge number of invalidations for large numbers of sharers, as shown for the 64-bit coarse vector in the graphs. However, the repacking does not improve the poor performance of coarse directory entry formats for small numbers of sharers in large partitions (and recall that small numbers of sharers is the norm). Thus, coarse formats are inferior to higher-dimensional formats with full coverage, even with repacking.

The present invention is an improvement over simple, one-dimensional coarse vector directories, such as used in the SGI Origin "™" 2000. In contrast to the one-dimensional approach, the present invention is based on the use of a multi-dimensional directory entry structure which describes each processor as a function of two or more bit vectors. In one embodiment, for instance, a multiprocessing system will use two bit vectors to provide a two-dimensional coarse bit vector.

This approach solves the problem of excessive, unnecessary invalidation messages that can result from a plain, one-dimensional, coarse vector directory structure. Alternately, it can be viewed as a solution to the directory size problem encountered by a full-bit-vector directory structure as the number of processors increase.

In certain cases, the multi-dimensional directory structure even reduces the number of extra invalidation messages that must be sent to processors when a line (block of memory) that was previously shared by multiple processors is written to by a processor. In addition, the size of each of the bit vectors can be varied and the coarseness can be allocated to the two or more bit vectors in different ways when in the coarse mode.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A multiprocessor computer system, comprising:
   a plurality of processor nodes;
   a memory, wherein the memory includes a plurality of lines and a cache coherence directory structure, wherein the plurality of lines includes a first line and wherein the cache coherence directory structure includes a plurality of directory structure entries; and
   an interconnect network connecting the plurality of processor nodes to the memory;
   wherein each directory structure entry includes processor pointer information indicating the processor nodes that have cached copies of the first line, wherein the processor pointer information includes a plurality n of bit vectors, where n is an integer greater than one, and wherein each processor node is associated with one bit in each of the n bit vectors.

2. The multiprocessor computer system according to claim 1, wherein each processor node includes one or more processors, wherein each processor is assigned a processor number and wherein each processor number is expressed as n sets of bits, wherein the n sets of bits do not overlap.

3. The multiprocessor computer system according to claim 1, wherein each processor node includes a plurality of processors.

4. The multiprocessor computer system according to claim 1, wherein each processor node includes one or more processors, wherein each processor is assigned a processor number, wherein each processor number is expressed as a function of a first set of bits and a second set of bits; and
   wherein the n bit vectors include a first bit vector and a second bit vector, wherein the first set of bits of the processor number is mapped into the first bit vector and wherein the second set of bits of the processor number is mapped into the second bit vector.

5. A method of maintaining cache coherency across a computer system having a plurality of processor nodes, including a first processor node and a second processor node, wherein each of the plurality of processor nodes includes a cache, the method comprising:
   assigning a processor number to each of the plurality of processor nodes;
   defining a plurality of bit vectors, wherein each processor node is represented by a bit in each of the plurality of bit vectors;
   determining a first location in memory;
   reading a line from the first location in memory into the cache of said first processor node, wherein reading includes setting a bit in each of the plurality of bit vectors as a function of the processor number assigned to the first processor node;
   reading a line from the first location into the cache of said second processor node, wherein reading a line from the first location in memory into the cache of said second processor node includes setting a bit in each of the plurality of bit vectors as a function of the processor number assigned to the second processor node; and
   writing a line to said first location in memory, wherein writing a line includes:
   a) determining, as a function of bits set in the bit vectors, processor nodes holding a copy of the line; and
   b) sending a message to the processor nodes determined in step a) indicating that the line read from the first location in memory is no longer valid.

6. The method according to claim 5 wherein the plurality of bit vectors includes a first bit vector, wherein the first bit vector is an N-to-$2^N$ mapping of the N least significant bits of the processor number.

7. The method according to claim 6 wherein the plurality of bit vectors further includes a second bit vector, wherein the second bit vector is an M-to-$2^M$ mapping of bits (M+N−1) through N of the processor number.

8. The method according to claim 7 wherein the plurality of bit vectors further includes a third bit vector, wherein the third bit vector is a P-to-$2^P$ mapping of bits (P+M+N−1) through M+N of the processor number.

9. The method according to claim 5 wherein sending a message to the processor nodes includes updating a line in the cache of the first and second processor nodes.

10. A method of maintaining cache coherency across a computer system having a plurality of processors, including a first processor and a second processor, wherein each of the plurality of processors includes a cache, the method comprising:
    assigning a processor number to each of the plurality of processors;
    defining a plurality of bit vectors, wherein each processor is represented by a bit in each of the plurality of bit vectors;
    determining a first location in memory;
    reading a line from the first location in memory into the cache of the first processor, wherein reading includes the step of setting a bit in each of the plurality of bit vectors as a function of the processor number assigned to the first processor;

reading a line from the first location in memory into the cache of the second processor, wherein reading from the first location into the cache of the second processor includes setting a bit in each of the plurality of bit vectors as a function of the processor number assigned to the second processor; and writing to the first location in memory, wherein writing a line includes the steps of:
  a) determining, as a function of bits set in the bit vectors, processors holding a copy of the line; and
  b) sending a message to the processors determined in step a) indicating that the line read from the first location in memory is no longer valid.

11. The method according to claim 10 wherein the plurality of bit vectors includes a first bit vector, wherein the first bit vector is an N-to-$2^N$ mapping of the N least significant bits of the processor number.

12. The method according to claim 11 wherein the plurality of bit vectors further includes a second bit vector and a third bit vector, wherein the second bit vector is an M-to-$2^M$ mapping of bits (M+N−1) through N of the processor number and the third bit vector is a P-to-$2^P$ mapping of bits (P+M+N−1) through M+N of the processor number.

13. The method according to claim 10 wherein sending a message to the processors includes updating a line in the cache of the first and second processors.

14. A computer readable medium having program code for maintaining cache coherency across a computer system having a plurality of processor nodes, including a first processor node and a second processor node, wherein each of the plurality of processor nodes has an assigned processor number and wherein each of the plurality of processor nodes includes a processor and a cache, the program code comprising:

program code for defining a plurality of bit vectors, wherein each processor node is represented by a bit in each of the plurality of bit vectors;

program code for determining a first location in memory;

program code for reading a line from the first location into the cache of said first processor node, wherein reading a line from the first location into the cache of said first processor node includes setting a bit in each of the plurality of bit vectors as a function of the processor number assigned to the first processor node;

program code for reading a line from the first location into the cache of said second processor node, wherein reading a line from the first location into the cache of said second processor node includes setting a bit in each of the plurality of bit vectors as a function of the processor number assigned to the second processor node; and program code for writing a line to said first location in memory, wherein the program code for writing includes:
  a) program code for determining, as a function of bits set in the bit vectors, processor nodes holding a copy of the line; and
  b) program code for sending a message to the processor nodes determined in step a) indicating that the line read from the first location in memory is no longer valid.

15. The computer readable medium according to claim 14 wherein the program code for sending a message to the processor nodes includes program code for updating the line in the cache of the first and the second processor nodes.

* * * * *

UNITED STATES PATENT AND TRADEMARK OFFICE
CERTIFICATE OF CORRECTION

PATENT NO. : 6,633,958 B1
DATED : October 14, 2003
INVENTOR(S) : Passint et al.

It is certified that error appears in the above-identified patent and that said Letters Patent is hereby corrected as shown below:

Column 13,
Line 10, insert -- are -- before "to".

Signed and Sealed this

Sixth Day of July, 2004

JON W. DUDAS
*Acting Director of the United States Patent and Trademark Office*